US012685253B2

(12) United States Patent
　　Kostkin

(10) Patent No.:　US 12,685,253 B2
(45) Date of Patent:　　Jul. 21, 2026

(54) CUTTING DEVICE FOR AGRICULTURAL MACHINES

(71) Applicant: Mikhail Kostkin, Vrhnika (SI)

(72) Inventor: Mikhail Kostkin, Vrhnika (SI)

(73) Assignee: PEK AUTOMOTIVE D.O.O., Vrhnika (SI)

( * ) Notice: Subject to any disclaimer, the term of this patent is extended or adjusted under 35 U.S.C. 154(b) by 262 days.

(21) Appl. No.: 18/706,504

(22) PCT Filed: Nov. 19, 2021

(86) PCT No.: PCT/IB2021/000735
§ 371 (c)(1),
(2) Date: May 1, 2024

(87) PCT Pub. No.: WO2023/089348
PCT Pub. Date: May 25, 2023

(65) Prior Publication Data
US 2025/0221333 A1　　Jul. 10, 2025

(51) Int. Cl.
*A01B 45/02*　　(2006.01)
*A01D 34/416*　　(2006.01)
*A01D 34/52*　　(2006.01)

(52) U.S. Cl.
CPC ................................... *A01D 34/52* (2013.01)

(58) Field of Classification Search
CPC ...... A01D 34/52; A01D 34/828; A01D 34/73;
　　　　　　　　A01D 34/733; A01D 34/68;
(Continued)

(56) References Cited

U.S. PATENT DOCUMENTS 4,077,190 A * 3/1978 Crites .................. A01D 34/535
　　　　　　　　　　　　　　　　　　56/504
6,158,202 A 12/2000 Jung
6,827,152 B2 * 12/2004 Lacona .................. A01D 43/02
　　　　　　　　　　　　　　　　　　56/16.7

FOREIGN PATENT DOCUMENTS

EP　　　　1338185 A1　　8/2003
EP　　　　3318116 A1　　5/2018
WO　　2014083550 A1　　6/2014

OTHER PUBLICATIONS

International Search Report of the EPO dated Jul. 21, 2022 with copy enclosed.
(Continued)

*Primary Examiner* — Matthew Troutman
*Assistant Examiner* — Robert E Pezzuto
(74) *Attorney, Agent, or Firm* — Patentbar International

(57) ABSTRACT

The invention relates to cutting devices with flexible blades for use on agricultural machines. The cutting device for agricultural machines includes a rotatable shaft (1) with at least two sets of grooves (5) on its outer surface, each of said sets being oriented along the shaft axis. Each groove (5) in each set houses the midsection of a cutting wire (6), meanwhile clamping rods are installed along the outer surface of the shaft (1) over each set of cutting wires (6) where the grooves (5) are located, the ends of each clamping rod (4) being fixed in the slots made at the shaft ends. Along its length, the shaft is equipped with a number of clamping elements capable of pressing the clamping rods (4) against the surface of the shaft and securing the midsection of a cutting wire in the groove (5) of the shaft.

8 Claims, 6 Drawing Sheets

(58) Field of Classification Search
CPC .............. A01D 34/4166; A01D 34/416; A01D
34/4165; A01D 34/4168; A01D 34/43;
A01D 34/42; A01D 34/44; A01D 34/46;
A01D 34/47
See application file for complete search history.

(56) References Cited

OTHER PUBLICATIONS

International Written Opinion of the EPO dated Jul. 21, 2022 with copy enclosed.

* cited by examiner

A-A

CUTTING DEVICE FOR AGRICULTURAL MACHINES

FIELD OF INVENTION

The invention relates to cutting devices with flexible blades rotating around the horizontal axis for use on agricultural machines.

PRIOR ART

Various designs of weed and grass cutting devices are known, which have a horizontal rotating shaft with flexible cutting elements mounted thereon.

Patent EP1338185, publication date 2006 Sep. 13, IPC A01B-045/02 is known, which discloses a design of an agricultural machine with a rotating horizontal shaft carrying a plurality of rotary heads with flexible filaments fixed upon thereon. Each filament has protrusions at its end for fixing the filament on the head. The machine is designed for cutting grass and dethatching.

Patent EP2874484, publication date 2016 Mar. 2, IPC A01D-034/416, describes the design of a head for a weed-mower that includes a support shaft with a plurality of disc-shaped modules mounted thereon and carrying flexible cutting elements. The modules flank each other side-by-side when mounted on the support shaft and form a substantially unitary tubular body with cutting elements. A single module can be detached from the adjacent modules if its cutting elements need to be replaced.

Another cutting device used preferably for cutting plants is known from Patent EP3318116, publication date 2019 Mar. 13, IPC A01B-045/02, which comprises a shaft indented with horizontal grooves. The grooves have pairs of throughbores, through which flexible cutting elements are passed with their ends extending outward the shaft. The grooves are covered with clamping strips for securing the cutting elements. The cutting device is equipped with flexible cutting elements.

The above design is the closest analog to the case in point.

DISCLOSURE OF INVENTION

The technical result achieved in the present invention is the enhancement of operational capability through making the replacement of all or individual cutting elements faster and easier, for example, when repairing the cutting device.

The cutting device for an agricultural machine comprises a rotatable shaft with at least two sets of grooves on its outer surface, each of said sets being oriented along the shaft axis. Each groove in each set houses the midsection of a cutting wire, meanwhile clamping rods are installed along the outer surface of the shaft over each set of cutting wires where the grooves are located, the ends of each clamping rod being fixed in the slots made at the shaft ends. Along its length, the shaft is equipped with a number of clamping elements capable of pressing the clamping rods against the surface of the shaft and securing the midsection of a cutting wire in the groove of the shaft.

In particular, each clamping element is made in the form of an annular clamping element, whose inner surface contains at least two curved surfaces with tooth-shaped ends capable of pressing the clamping rods against the shaft surface.

The surface of the clamping rods features transverse annular grooves for mounting annular clamping elements.

Moreover, the clamping element is equipped with a stopper configured to restrict its turning.

In particular, the clamping element is designed in the form of a split sleeve.

The cutting wire is made of a flexible polymer material.

In another embodiment, the cutting wire is made of steel.

Furthermore, shock-absorbing pads are installed in the grooves of the shaft

EMBODIMENTS OF THE INVENTION

Figure 1:
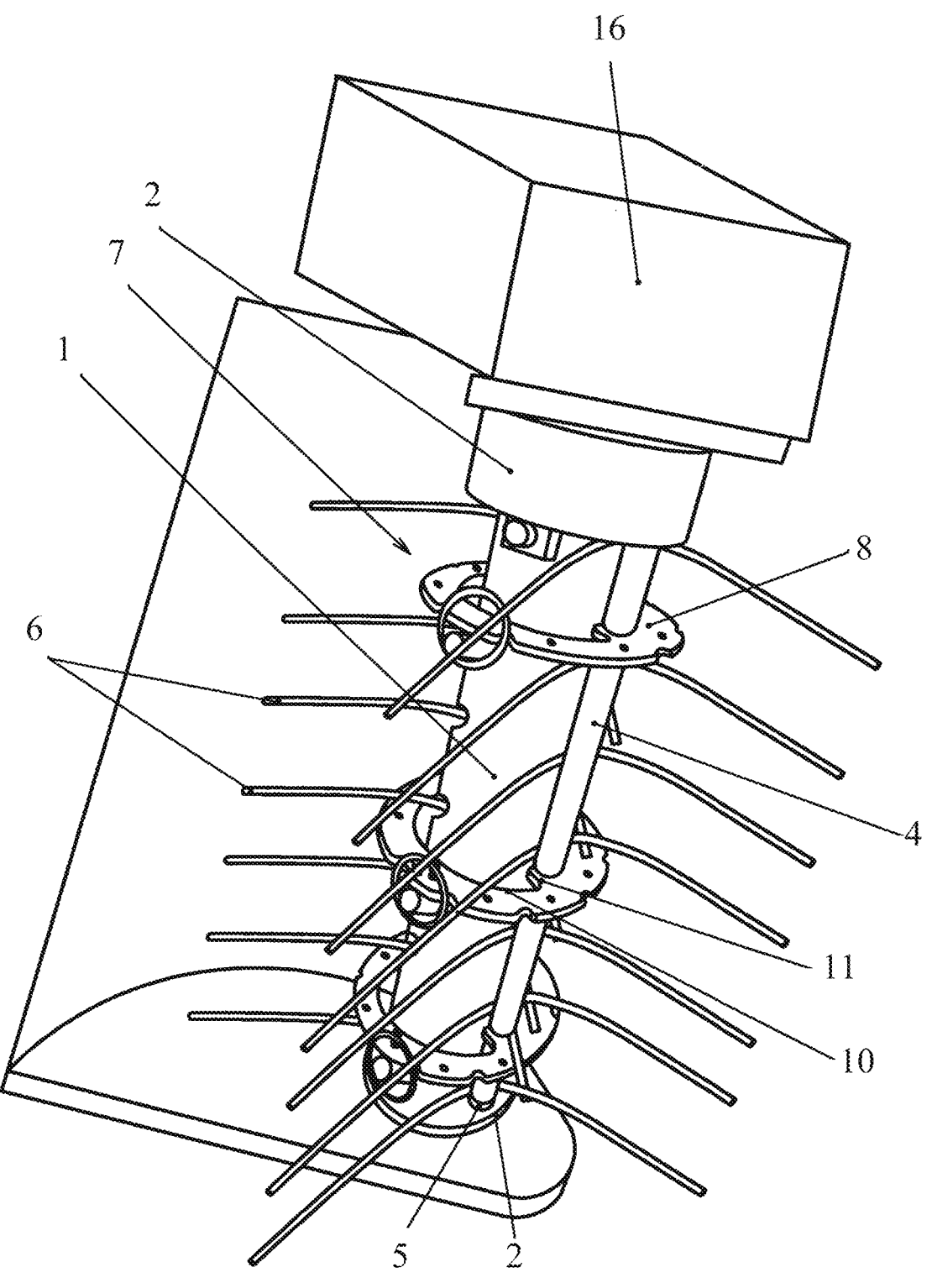
FIG. 1 shows a general view of the cutting device.
Figures 2, 3:
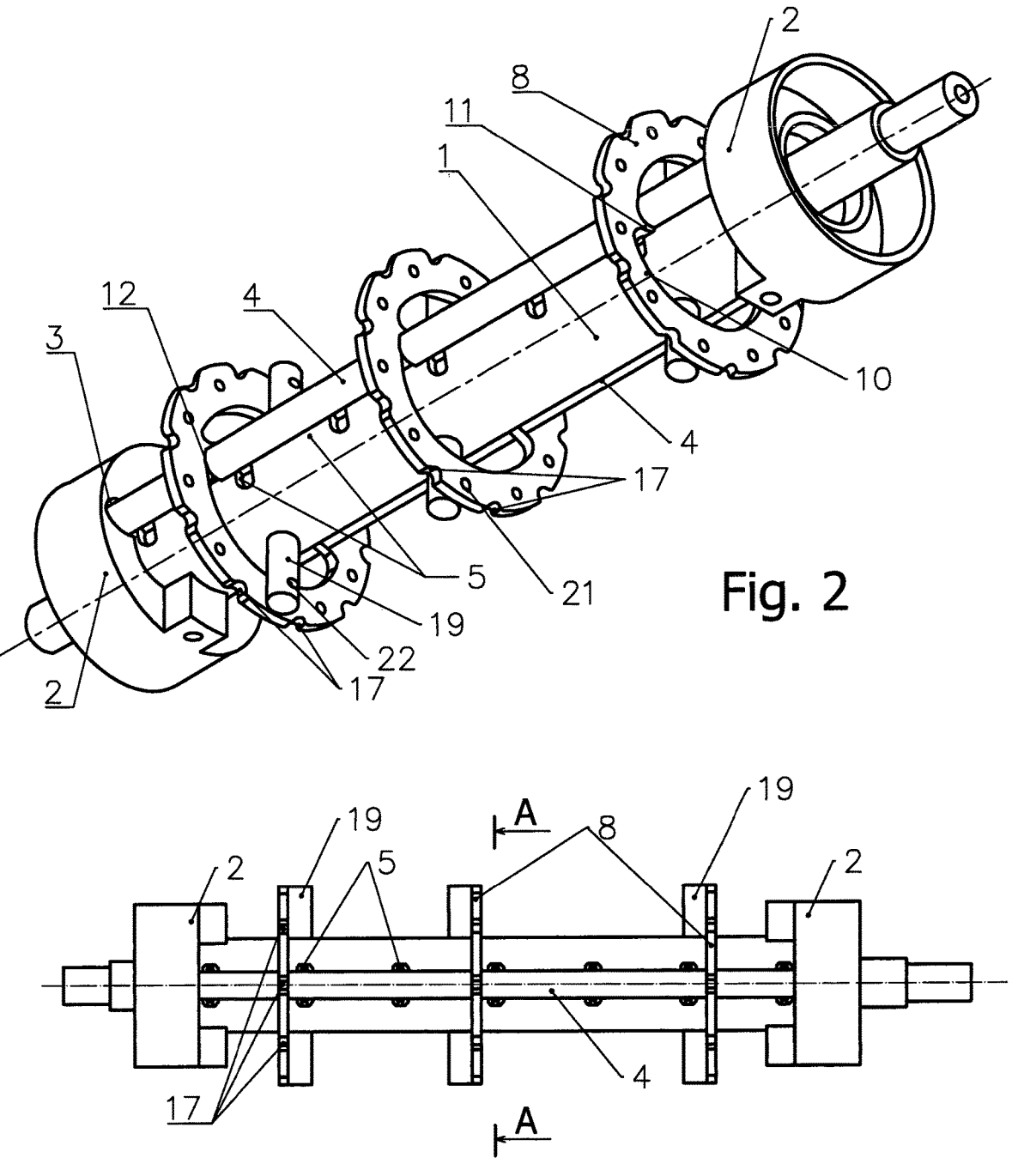
FIG. 2 shows a general view of the shaft of the cutting device with clamping elements.
FIG. 3 shows a side view of the shaft of the cutting device with clamping elements.

A cutting device for agricultural machines (FIG. 1) comprises a shaft 1 fixed in bearing assemblies and spun with a drive 16. At least two sets of grooves 5 are indented on the outer surface of the shaft 1, each of them being oriented along the axis of the shaft 1. Each groove 5 of each set houses the midsection of cutting wires 6. The cutting wire 6 can be made of a flexible polymer material or steel, depending on the application of the cutting device. Clamping rods 4 are installed over each set of cutting wires 6 in places where the grooves 5 are located on the outer surface of the shaft 1. The ends of each clamping rod 4 are secured in slots 3 of rings 2 mounted at the ends of the shaft 1. Thus, each clamping rod 4 is capable of a short travel in the direction of the radius of the shaft 1 (FIG. 2).

Lengthwise the shaft 1, a number of clamping elements 7 (FIG. 1, FIG. 9) adapted for pressing the clamping rods 4 against the surface of the shaft 1 and fixing the midsection of the cutting wire 6 in the groove 5 of the shaft 1 are installed.

Figure 9:
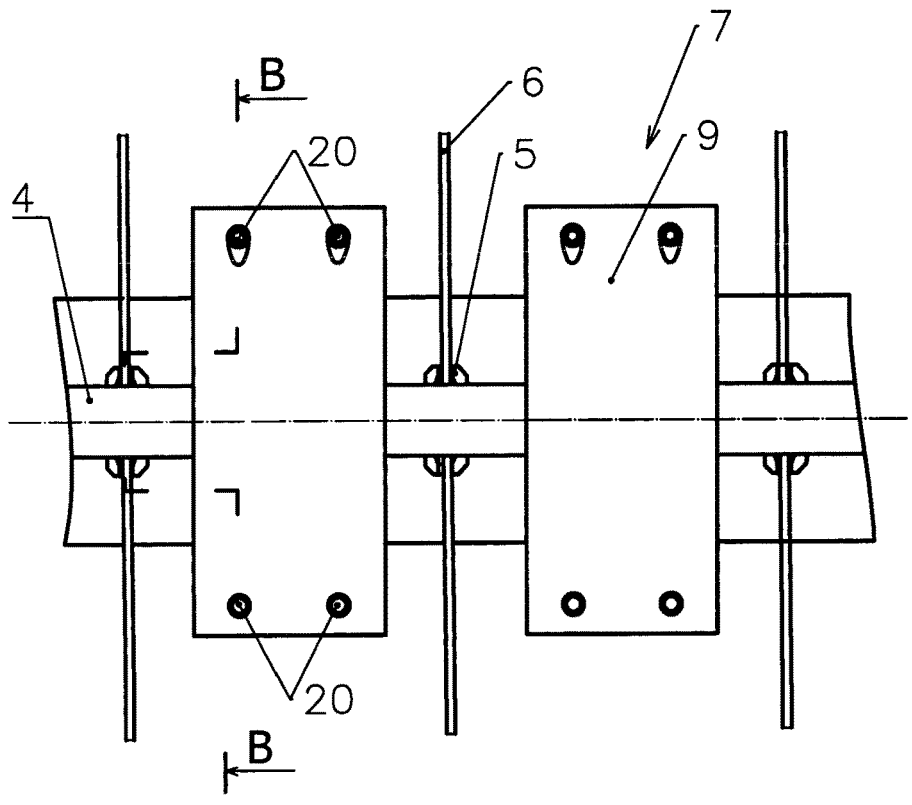
FIG. 9 shows an optional clamping element on the shaft.
Figure 10:
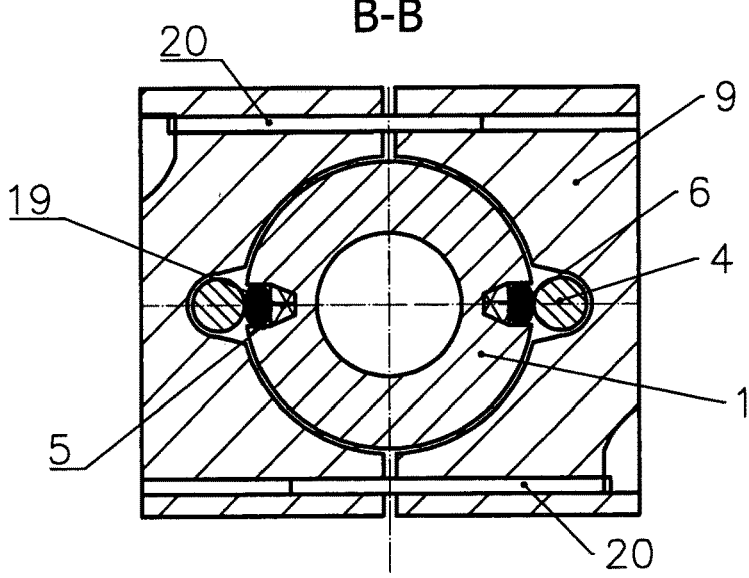
FIG. 10 shows the cross-section of the clamping element and the shaft.

The clamping element 7 can be designed as an annular clamping element 8 (FIG. 1-FIG. 6), or as a split sleeve 9 (FIG. 9, FIG. 10).

The annular clamping element 8 (FIG. 4, FIG. 5) has at least two curved surfaces 10 with a tooth-shaped ending 11 configured for pressing clamping rods 4 against the surface of the shaft 1. Wherein, the curved surfaces 10 of the annular clamping element 8 are held in transverse annular grooves 12 indented in clamping rods 4 (FIG. 5, FIG. 2). The mounting of annular clamping elements 8 in the transverse annular grooves 12 of clamping rods 4 permits them to rotate in a single plane.

Figure 4:
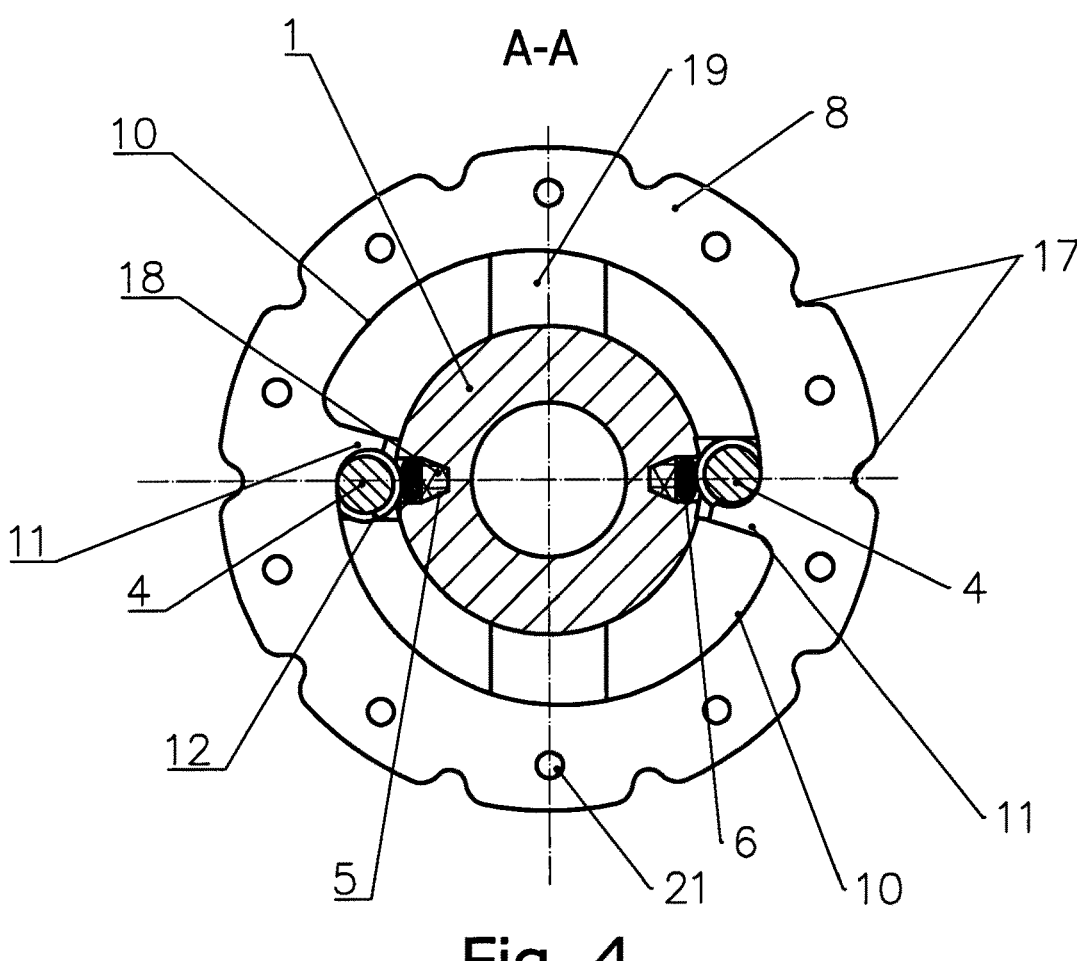
FIG. 4 shows the cross-section of the shaft shown in FIG. 3.
Figure 5:
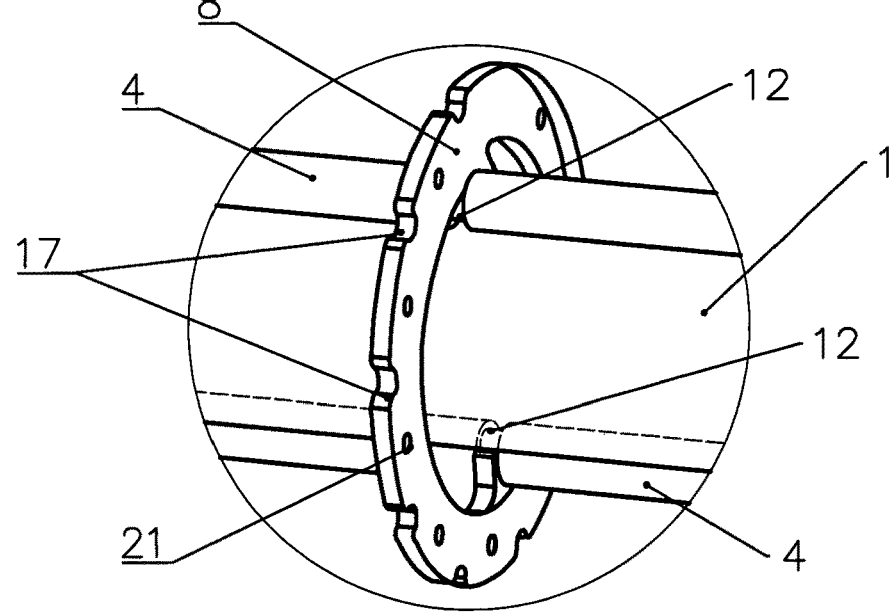
FIG. 5 shows an optional mounting of the annular clamping element on a clamping rod.

FIG. 4 shows that the grooves 5 on the shaft 1 contain spacers 18, which prevent excessive squeezing of the cutting wire 6 with the clamping rod 4 in the point of its contact with the shaft 1.

Figure 7:
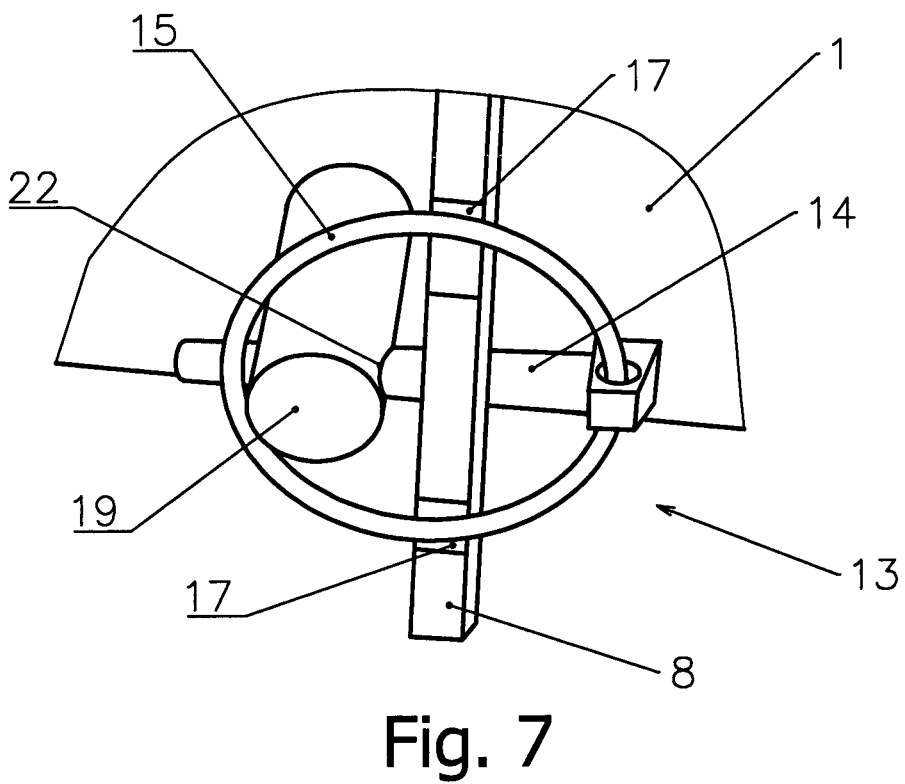
FIG. 7 shows a stopper for clamping elements.
Figure 8:
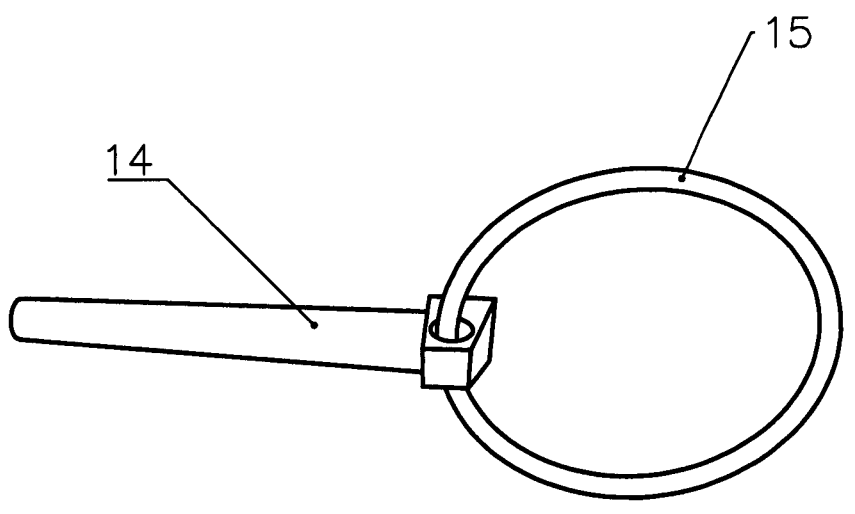
FIG. 8 shows a safety element of the stopper in the form of a rod with a swing ring.

Dents 17 are made on the outer surface of the annular clamping element 8 (FIG. 7 and FIG. 8).

Stoppers 13, designed to prevent the annular clamping elements 8 from turning, consist of a pin 14, which passes through an opening 21 in the annular clamping element 8 and opening 22 in a stud 19 fixed on the shaft 1 (FIG. 7). A swing ring 15 is used to immobilize the pin 14 relative to the annular clamping element 8. After having been swung, the swing ring 15 is inserted into dents 17 of the annular clamping element 8 and through the stud 19.

Figure 6:
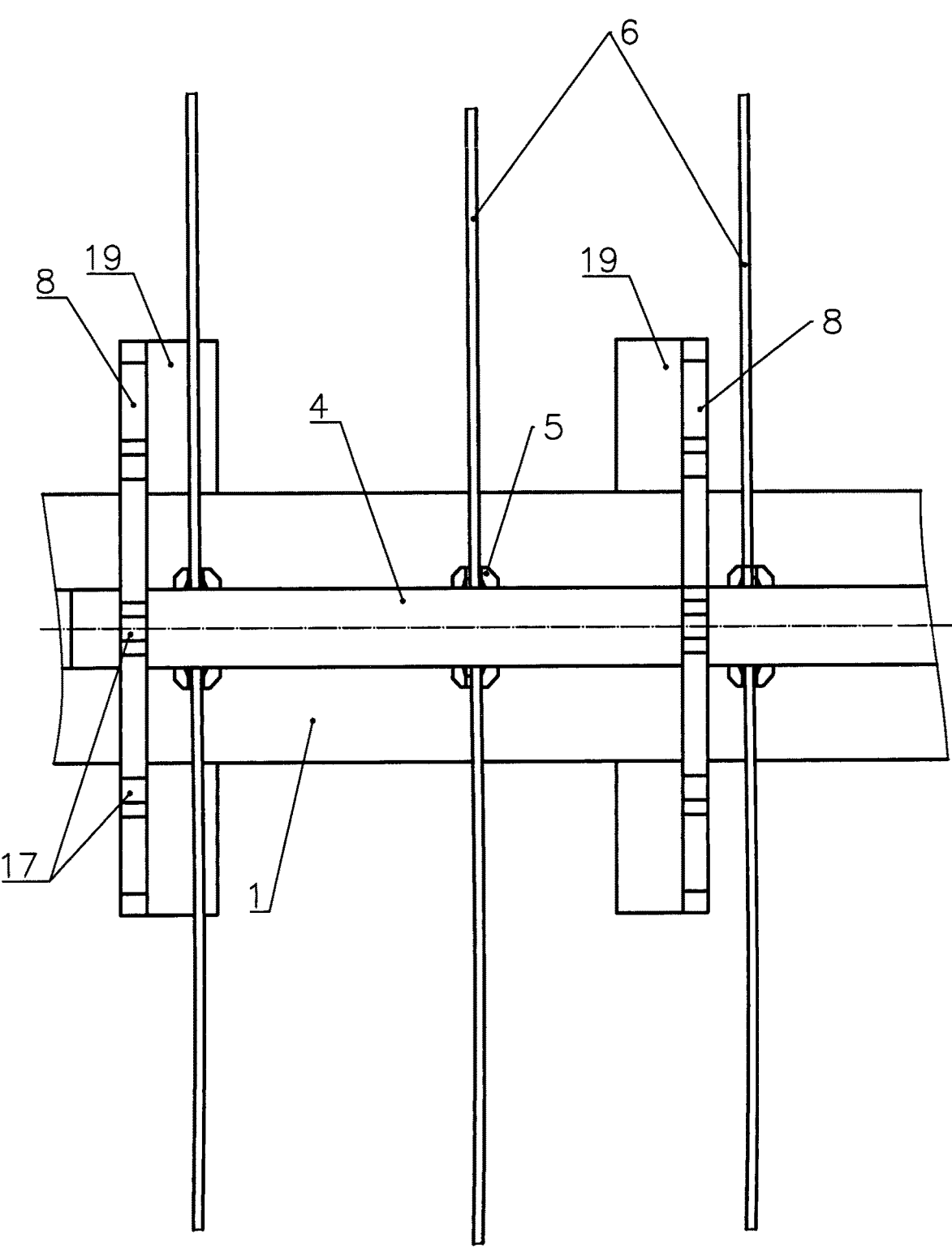
FIG. 6 shows a side view of the shaft section with cutting elements

FIG. 6 shows the position of the cutting wires 6 in the grooves 5 of the shaft 1. A set of grooves 5 together with the midsection of each cutting wire 6 are clamped down with the clamping rod 4 and anchored to the surface of the shaft 1.

The replacement of cutting wire in a cutting device with an annular clamping element 8 in operational conditions is performed as follows.

As a first step, the stoppers 13 are removed. To perform this operation, the swing ring 15 is retrieved from the dents 17 on the annular clamping element 8 and is swung to release the annular clamping element 8. The pin 14 is withdrawn from the opening 22 in the stud 19 and opening 21 in the annular clamping element 8. Thereafter, the annular clamping elements 8 are turned so that their teeth 11 release the clamping rod 4 over the corresponding set of grooves 5, where the cutting wire 6 needs to be replaced. The clamping rod 4 shifts its position in the slots 3, releasing the cutting wires 6. The damaged cutting wire 6 is replaced with a new one, and the annular clamping elements 8 are turned to press the clamping rod 4 against the surface of the shaft 1, thus fixing the midsection of the cutting wires 6 in a set of grooves 5 of the shaft 1. Thereafter, the pins 14 of the stoppers 13 are set in place and the swing rings 15 are inserted into the dents 17 of the annular clamping elements 8.

A clamping element 7 made in the form of a split sleeve 9 is shown in FIG. 9, FIG. 10. Both parts of the split sleeve 9 are mounted on the shaft 1 and are fastened with screws 20 to press the clamping rods 4 and the midsection of each cutting wire 6 in the grooves 5 against the surface of the shaft 1. To remove individual cutting wires 6, the screws 20 have to be loosened. The clamping rods 4 shift their position in the slots 3, thus releasing the cutting wires 6.

INDUSTRIAL APPLICABILITY

The design of the cutting device provides for secure fixing of cutting wires in the shaft grooves. The replacement of damaged cutting elements is performed in the field. The replacement of cutting elements can be performed by a single operator; it takes little time and requires no special equipment.

The invention claimed is:

1. A cutting device for agricultural machines comprising:
   a rotatable shaft having at least two sets of grooves on an outer surface of the shaft, each of the sets being oriented along an axis of the shaft;
   each groove of each set housing a midsection of a cutting wire, the outer surface of the shaft over each set of cutting wires and above the grooves being equipped with clamping rods, each clamping rod having ends, the ends of each clamping rod being fixed in slots made at shaft ends, the shaft having a number of clamping elements along its length for pressing the clamping rods against the surface of the shaft for securing the midsection of each cutting wire in its respective groove of the shaft.

2. The cutting device as of claim 1, wherein each clamping element is made in a form of an annular clamp with its inner surface containing at least two curved surfaces with tooth-shaped ends, and capable of pressing the clamping rods against the shaft surface.

3. The cutting device as of claim 1, wherein the surface of the clamping rods has transverse annular grooves for mounting the clamping elements.

4. The cutting device as of claim 1, wherein each clamping element is equipped with a stopper, the stopper limiting rotation of each clamping element around the shaft.

5. The cutting device as of claim 1, wherein each clamping element is made in a form of a split sleeve.

6. The cutting device as of claim 1, wherein each cutting wire is made of a flexible polymer material.

7. The cutting device as of claim 1, wherein each cutting wire is made of steel.

8. The cutting device as of claim 1, wherein shock-absorbing pads are installed in the grooves of the shaft.

* * * * *